UNITED STATES PATENT OFFICE.

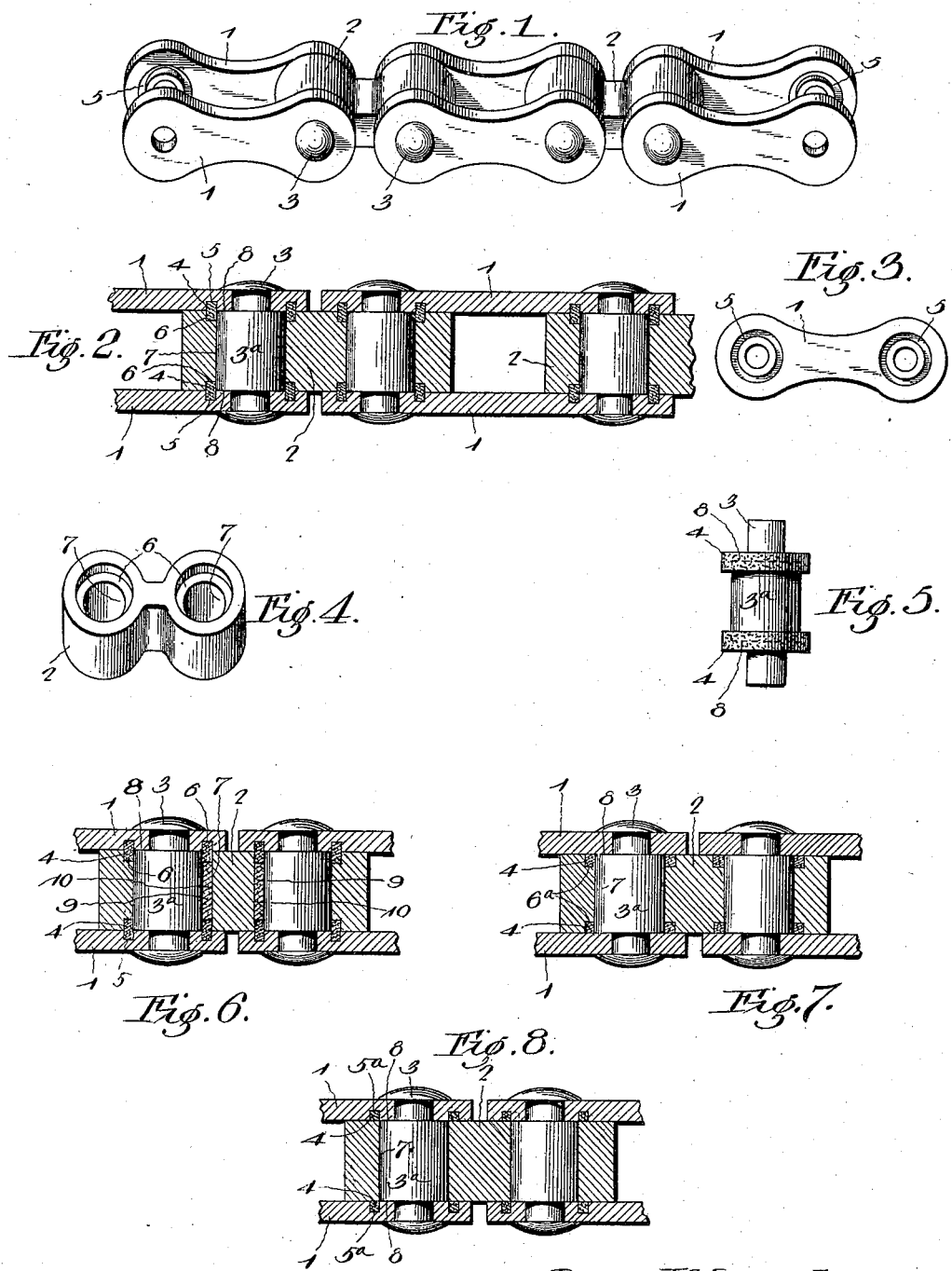

BRUCE J. MACDONALD, OF FLINT, MICHIGAN.

DRIVE-CHAIN.

SPECIFICATION forming part of Letters Patent No. 629,515, dated July 25, 1899.

Application filed July 30, 1898. Serial No. 687,340. (No model.)

*To all whom it may concern:*

Be it known that I, BRUCE J. MACDONALD, a citizen of the United States, residing at Flint, in the county of Genesee and State of Michigan, have invented a new and useful Drive-Chain, of which the following is a specification.

My invention relates to a dust-proof self-lubricating drive-chain for bicycles or other machines, and has for its object to provide such a construction of chain elements as to exclude dust and grit from the joints and at the same time secure the efficient lubrication of the parts at their points of contact.

Further objects and advantages of this invention will appear in the following description, and the novel features thereof will be particularly pointed out in the appended claims.

In the drawings, Figure 1 is a perspective view of a chain constructed in accordance with my invention. Fig. 2 is a longitudinal section of the same, taken in the plane of the link-connecting pivot-pins. Fig. 3 is an inner face view of one of the plate-links. Fig. 4 is a detail view in perspective of one of the block-links. Fig. 5 is a plan view of one of the pivot-pins, showing the packing-rings arranged in operative relation therewith. Fig. 6 is a sectional view similar to Fig. 2, showing, in addition to the packing-rings, a lubricating-strip seated in the pin-opening of the block-link for contact with the surface of the pivot-pin. Fig. 7 is a sectional view similar to Fig. 2, showing the packing-rings located wholly in seats formed in the block-links. Fig. 8 is a similar view showing the packing-rings arranged in seats located wholly in the plate-links.

Similar numerals of reference indicate corresponding parts in all the figures of the drawings.

The chain embodying my invention consists, essentially, of plate-links 1, block-links 2, and pivot-pins 3, connecting the links in series substantially as in the ordinary construction and having exterior or exposed surfaces corresponding exactly with drive-chains now in common use in connection with bicycles and similar vehicles.

It is well known in the art that the wearing of drive-chains, due to the continued use thereof, occurs at the exterior surface of the body portion of the pivot-pin and the inner surface or wall of the eye or pin-hole of the block-link, thus increasing the length of the chain and consequently its pitch and ultimately causing the chain to climb the sprockets. As it requires an enlargement of only one two-hundredths of an inch in the pin-hole or eye of the block-link and a corresponding reduction of the pivot-pin in order to cause the climbing of the sprockets by the chain, it will be readily seen that it is desirable in the construction of chains to provide against the access of grit, such as dust, to the joints between the elements of a chain, and also to provide for the efficient lubrication of these joints in order to reduce friction to the minimum.

In order to exclude dust and foreign substances from the bearings of the pivot-pins in the block-links, I have found it desirable to employ packing-rings 4, of felt or equivalent soft absorbent material, surrounding the pivot-pins and in contact with the opposing faces of the plate and block links, one edge of the ring being countersunk or fitted in a groove in the face of one of the links. These packing-rings may be disposed to break joint between the inner faces of the plate-links and the side surfaces of the block-links, as shown in Fig. 2, by providing the contacting faces of said plate and block links with registering annular grooves or channels 5 and 6; but in order at the same time to serve as a lubricating medium and also to assist in the exclusion of dust I preferably form the annular grooves or channels 6 in the block-links so as to break into and communicate throughout their lengths with the pin-holes or bearing-eyes 7 of the block-links. This disposes the inner cylindrical surfaces of the lubricating mediums, when arranged in said grooves or channels, flush with the surface of the wall of the pin-hole or bearing-eye and in contact with the surface of the body portion 3ᵃ of the pivot-pin contiguous to the shoulders 8, formed by the terminal reductions of the pin. As in the ordinary practice, the pivot-pin shown in the drawings is reduced at its extremities to form the said shoulders 8, which are arranged at an interval equal with or slightly exceeding the width of the block-link, and against these shoulders the inner surfaces of the plate-links bear, whereby when the projecting portions of the reduced extremities of the pivot-pins are spread or swaged the pivot-pin is securely locked to and connects the corresponding ends of the opposite plate-links. This causes the turning of the body portion of the pivot-pin in the pin-opening or bearing-eye of the block-link, and consequently the wear due to the use of the chain falls upon the surface of said pin-opening or bearing-eye and the surface of the body portion of the pivot-pin. As above indicated, there must be a sufficient interval between each side surface of the block-link and the contiguous inner surface of the plate-link to allow free relative movement of the plate and block links, and it is through this interval, although exceedingly small in practice, that dust and grit gain access to the points of bearing of the chain elements. By having packing-rings 4, however, located to break this joint or span this interval, whether carried solely by grooves or channels $6^a$ in the block-links, as shown in Fig. 7, to bear at their outer edges against the inner surfaces of the plate-links or seated wholly in channels $5^a$, formed in the inner surfaces of the plate-links, as shown in Fig. 8, and bearing at their inner edges against the side surfaces of the block-link or seated at their opposite edges in registering grooves 5 and 6, formed in the contiguous faces of the plate and block links, as shown in Fig. 2, I am enabled to positively exclude dust from the contacting and relatively-movable members of the chain, and thus vastly increase the durability and prolong the "life" or period of usefulness thereof.

It will be seen that in each of the forms of my invention disclosed in the drawings the packing-ring is seated at at least one edge in a channel in one link and bears against or is in contact at the other edge with the other link to prevent access of sand or dirt to the pin-bearing. It is obvious that these packing-rings may perform the packing function ascribed to them without having their inner cylindrical surfaces in contact with the surfaces of the body portions $3^a$ of the pivot-pins; but this contact with the pivot-pins not only increases the efficiency of the rings as means of excluding dust, but enables me, by employing absorbent material for the packing-rings and charging the same with a lubricating material, to apply a lubricant continuously to the said contacting surfaces of the chain elements, and hence in practice I prefer to form the channels or seats 6 as rabbets at the extremities of the bearing-eyes or pin-openings of the block-links, as shown in Figs. 2, 3, 4, and 7.

Additional lubricating-strips 9 may be let into grooves 6, formed axially in the walls of the pin-openings or bearing-eyes of the block-links and extending between the planes of the contiguous edges of the opposite packing-rings 4, said strips being of any suitable cross-sectional contour, as round or angular, but preferably being held against displacement in a direction perpendicular to the axis of the bearing by a cross-sectional enlargement of the channel as it recedes from the surface of the pin-opening or bearing-eye. A round packing-strip, as shown in Fig. $6^a$, is efficient in practice as having the above-mentioned quality, the cross-sectional shape thereof adapting it to be inserted longitudinally into the groove or channel formed for its reception. Furthermore, the groove or channel 10 for the lubricating-strip 9 is terminally open or exposed, and when used in connection with the annular grooves or channels in the faces of the block-links communicates with said grooves or channels, whereby the introduction of lubricating material to the packing-strips, which are adapted to perform, as above indicated, the additional function of lubricating mediums, serves to charge the lubricating-strip, and thus insure a constant application of lubricant to the surface of the body portion of the pivot-pin. It will be seen, furthermore, that the exterior or exposed surface of the chain embodying the packing and lubricating features of my invention is identical with that of the ordinary forms of drive-chains now in use, no portions of the lubricating or packing devices or the grooves or channels in which they are seated being formed in or extending to the exposed surfaces of the chain elements.

Various changes in the form, proportion, and the minor details of construction may be resorted to without departing from the spirit or sacrificing any of the advantages of this invention.

Having described my invention, what I claim is—

1. A drive-chain for vehicles, comprising terminally-overlapping block and plate links having facing sides contiguously arranged, pivot-pins connecting transversely opposite plate-links and mounted to turn in bearing-eyes or pin-holes of the block-links, and packing-rings surrounding portions of the pivot-pins and having their opposite end edges inclosed by the overlapping portions of the said links and relatively engaging parts of the said links, the one end edge of each ring being let into a groove in the facing side of one link and bearing at its other edge against the other link, the inner cylindrical surface of each ring being also flush with the wall of the bearing-eye or pin-opening near to the same in the block-link.

2. A drive-chain for vehicles, comprising block and plate links, and pivot-pins connecting transversely opposite plate-links, mounted to turn in bearing-eyes or pin-holes of the block-links, packing-rings carried by the links to break joint between the contiguous side faces thereof, and arranged at their inner surfaces in contact with the surface of the pivot-pin, and packing-strips connecting transversely opposite packing-rings, substantially as specified.

3. A drive-chain for vehicles, comprising block and plate links, and pivot-pins connecting transversely opposite plate-links, mounted to turn in bearing-eyes or pin-holes of the block-links, packing-rings carried by the links to break joint between the contiguous side faces thereof, and arranged at their inner surfaces in contact with the surface of the pivot-pin, and packing-strips parallel with the pivot-pin and connecting the packing-rings at opposite sides of the block-link, substantially as specified.

4. A drive-chain having block and plate links, and pivot-pins connecting transversely opposite plate-links and mounted at intermediate points to turn in bearing-eyes or pin-openings of the block-links, said block-links being provided at their sides with annular channels and in the walls of their bearing-eyes or pin-openings with open-ended longitudinal channels, packing-rings arranged at their inner edges in said annular channels and in contact at their outer edges with the plate-links, and packing-strips arranged in said longitudinal channels, substantially as specified.

5. A drive-chain having plate and block links, and pivot-pins connecting transversely opposite plate-links and mounted at intermediate points to turn in bearing-eyes or pin-openings of the block-links, said bearing-eyes or pin-openings being counterbored at their ends to form inwardly-opening packing-ring seats, and being grooved longitudinally to form open-ended channels communicating with said packing-ring seats, packing-rings fitted at their inner edges in said seats and in contact at their outer edges with the plate-links, and lubricating-strips seated in said channels to receive lubricating material from the packing-ring seats, substantially as specified.

In testimony that I claim the foregoing as my own I have hereto affixed my signature in the presence of two witnesses.

BRUCE J. MACDONALD.

Witnesses:
J. H. RANKIN,
FRANK S. TURNER.